United States Patent [19]

Conrad

[11] Patent Number: 4,971,255
[45] Date of Patent: Nov. 20, 1990

[54] GRANULAR CHEMICAL BANDER

[76] Inventor: Larry M. Conrad, R. R. #1, Box 103, Delta, Iowa 52550

[21] Appl. No.: 408,998

[22] Filed: Sep. 18, 1989

[51] Int. Cl.$^5$ .............................................. B05B 1/14
[52] U.S. Cl. ................................. 259/650; 239/553.3; 239/553.5; 239/568
[58] Field of Search ............ 239/568, 597, 590, 590.3, 239/590.5, 553, 553.3, 553.5, 689, 654, 555

[56] References Cited

U.S. PATENT DOCUMENTS

| | | | |
|---|---|---|---|
| 805,337 | 11/1905 | Blake | 239/553.5 X |
| 1,895,890 | 1/1933 | Meng | 239/553.5 |
| 2,588,245 | 3/1952 | Jordan | 239/568 X |
| 2,990,186 | 6/1961 | Gandurd | 239/689 X |
| 3,074,727 | 1/1963 | Sosalla et al. | 239/689 |
| 4,185,780 | 1/1980 | Duchene et al. | 239/590.5 X |

Primary Examiner—Andres Kashnikow
Assistant Examiner—Kevin Weldon
Attorney, Agent, or Firm—Henderson & Sturm

[57] ABSTRACT

A granular chemical bander including a housing having an upper neck section and a lower body section. The neck section has a top opening for receiving a supply tube, and a horizontally disposed deflector plate having feed openings at each lateral side. The body section is divided into a front compartment in communication with the opening of one lateral side, and a rear compartment in communicaton with the opening at the other lateral side. Granular material flowing into the front and rear compartments is directed laterally away from the respective feed opening by diagonal baffles and is discharged in a band laterally off-set from the feed opening.

13 Claims, 3 Drawing Sheets

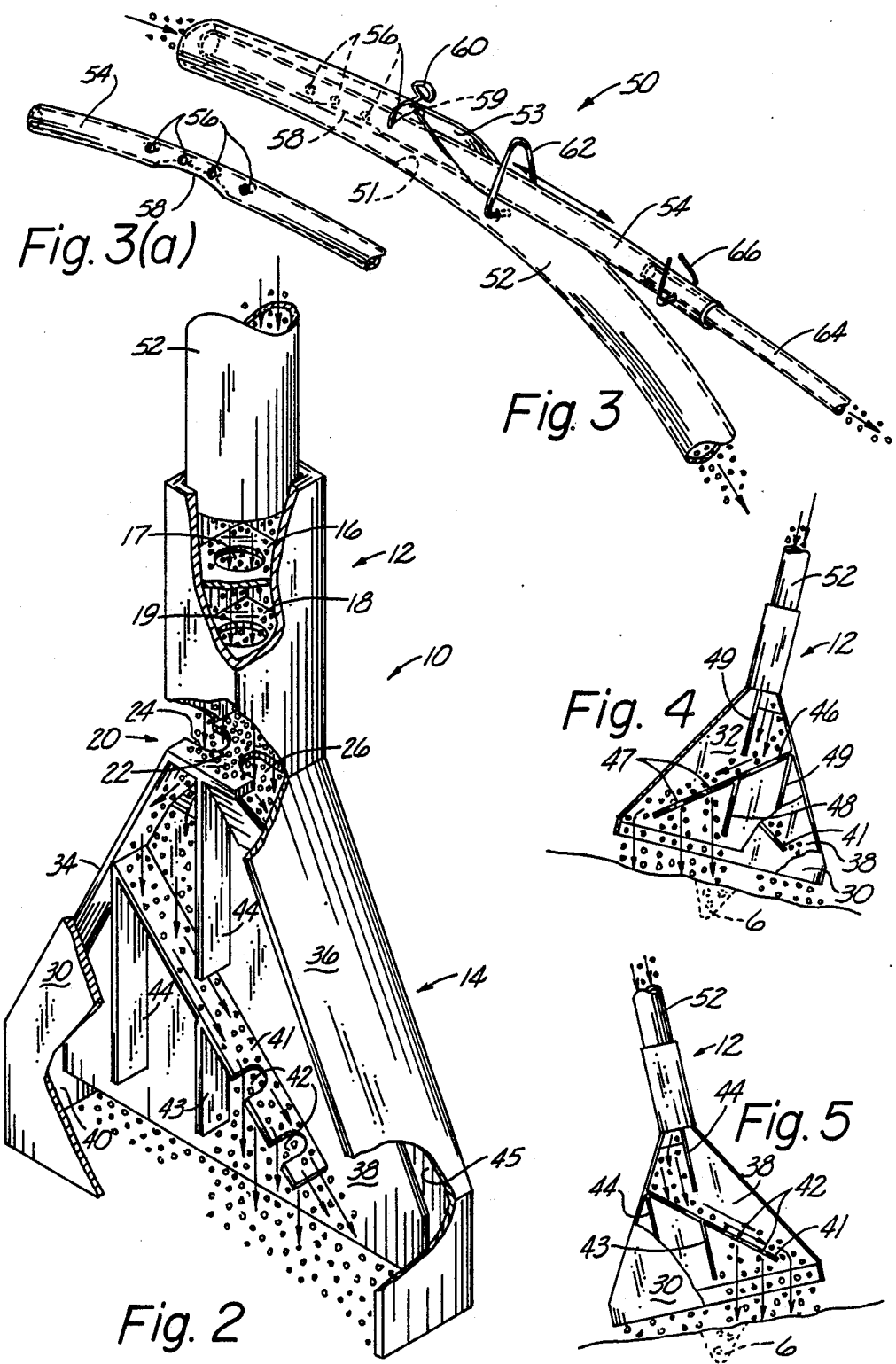

GRANULAR CHEMICAL BANDER

TECHNICAL FIELD

This invention relates to chemical spreaders, and more particularly to a chemical bander used on seed planting units.

BACKGROUND ART

Standard banders or spreaders fail to produce a good distribution pattern of granular material deposited on hillsides. The side-to-side slope of the ground affects the bandwidth and distribution pattern. As the planter unit tilts, the granules run toward the downhill side of the bander. At about a fifteen percent slope, all of the granules run out of the downhill side depositing a thin band of material downhill from the seed furrow, rather than a wide band over the seed furrow.

Conventional banders have uneven patterns on level ground, lose thirty percent to sixty percent of the effective pattern on a seven to ten percent slope, and lose sixty percent to all of the effective pattern on a ten to twenty percent slope. Because of poor placement, agricultural chemicals may be ineffective resulting in inefficient production and increased costs.

Those concerned with these and other problems recognize the need for an improved granular chemical bander.

The present invention provides a granular chemical bander including a housing having an upper neck section and a lower body section. The neck section has a top opening for receiving a supply tube, and a horizontally disposed deflector plate having feed openings at each lateral side. The body section is divided into a front compartment in communication with the opening of one lateral side, and a rear compartment in communication with the opening at the other lateral side. Granular material flowing into the front and rear compartments is directed laterally away from the respective feed opening by diagonal baffles and is discharged in a band laterally off-set from the feed opening.

The bander is typically located behind the seed furrow closing mechanism on a planter. When the planter is traveling over level ground, the deflector plate remains horizontal and granular material flows through the feed openings into both the front and rear compartments, and is deposited on the ground in two adjacent bands over the seed furrow. When the planter is traveling over sloping ground, the deflector plate is tilted and the granular material flows out of the low side feed opening, into the respective compartment and is deposited on the ground in a single band on the uphill side of the seed furrow.

An object of the present invention is the provision of an improved granular chemical bander.

Another object is to provide a bander than maintains an acceptable spread pattern on sloping terrain.

A further object of the invention is the provision of a granular chemical bander that is easy to use and maintain.

Still another object is to provide a bander that is simple in design and durable.

A still further object of the present invention is the provision of a granular chemical bander that is inexpensive to manufacture.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 2 is an enlarged perspective view of the bander with portions cut away to show the structure within the housing;

FIG. 3 is a perspective view of the adjustable supply tube that interconnects the storage hopper and the bander;

FIG. 3(a) a pespective view of the secondary supply tube illustrating the sidewall opening;

FIG. 4 is an elevational view with portions cut away to show the flow of material entering into the rear compartment;

FIG. 5 is an elevational view with portions cut away to show the flow of material entering into the front compartment.

BEST MODE FOR CARRYING OUT THE INVENTION

Figure 1:
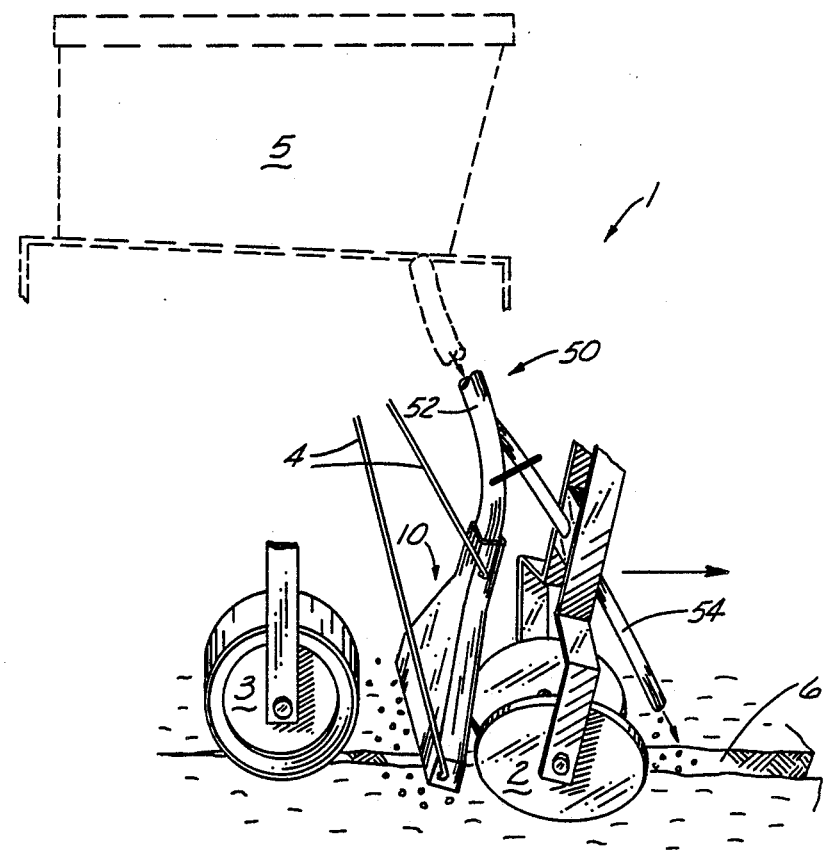
FIG. 1 is a perspective view showing the granular chemical bander of the present invention mounted on a planting unit.

Referring now to the drawings, wherein like reference numerals designate identical or corresponding parts throughout the several views, FIG. 1 shows the bander (10) of the present invention mounted on a planter unit (1). The bander (10) is secured in position between the furrow closing wheels (2) and the compaction wheel (3) by support rods (4). An adjustable supply line (50) interconnects the bander (10) and the granular chemical storage hopper (5). The primary supply tube (52) feeds into the bander (10) and a secondary supply tube (54) extends forward and feeds into the seed furrow (6) ahead of the closing wheels (2).

As best shown in FIG. 3, the primary supply tube (52) has a slot opening (53) through which the secondary supply tube (54) is adjustably inserted into the interior of the primary tube (52). Apertures (56) are spaced along a portion of the secondary tube (54) in the vicinity of a sidewall opening (58) which opens to the bottom side of the secondary supply tube (54). An aperture (59) in the primary tube (52) and one of the apertures (56) in the secondary tube (54) receives a locking pin (60) when the apertures (56, 59) are in registry. The sidewall opening (58) is thus adjustably spaced from the interior sidewall (51) of the primary supply tube (52). When the secondary tube (54) is fully inserted, the sidewall opening (58) is adjacent the interior sidewall (51) and the flow of granular material through the secondary tube (54) is at a maximum. When the secondary tube (54) is locked at a lower position, the sidewall opening (58) is spaced from the interior sidewall (51) to allow flow to be apportioned between the primary and secondary tubes (52, 54). When the secondary tube (54) is retracted from the slot opening (53), the resiliency of the primary tube material causes the slot opening (53) to close, and flow of granular material is contained within the primary tube (52). A retaining ring (62) assists in holding the secondary tube (54) in position, and an adjustable extension (64) is held in position by a pin (66).

Figure 6:
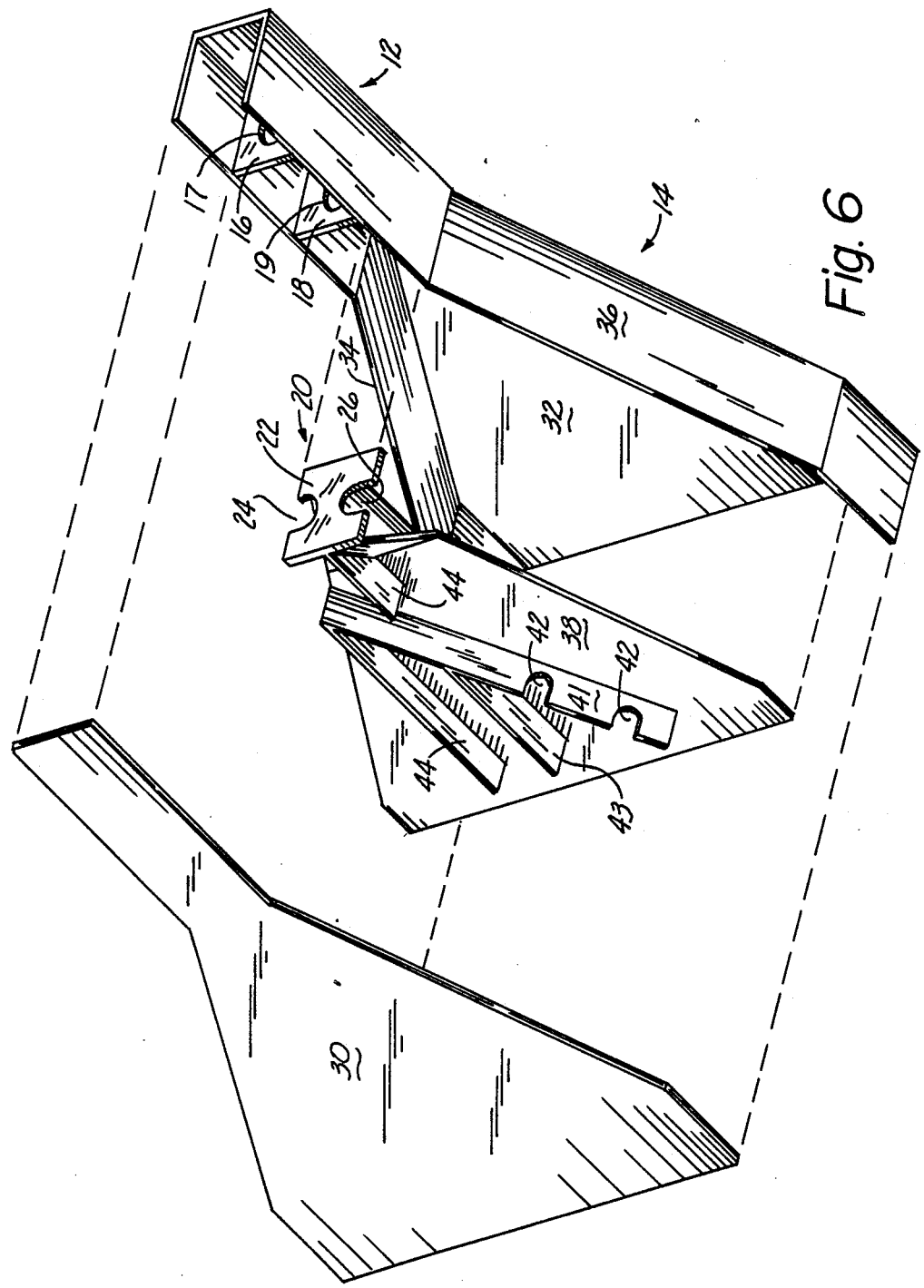
FIG. 6 is an exploded perspective view illustrating an embodiment of a three piece assembly of the bander.

As most clearly shown in FIGS. 2 and 6, the bander (10) includes a housing defining an upper neck section (12) and a lower body section (14). The neck section (12) includes a top opening that receives the end of the primary tube (52). A first focusing plate (16) and a second focusing plate (18) are positioned in spaced relationship within the neck section (12) above a horizontally disposed deflector plate (20). The central portion (22) of the deflector plate (20) is positioned directly below central openings (17, 19) in the first and second focusing plates (16, 18). The deflector plate (20) has a first opening (24) and a second opening (26) at opposing lateral sides thereof.

The body section (14) includes a front wall (30), a rear wall (32), opposing sidewalls (34, 36), and a divider panel (38) that divides the body section (14) into separate front and rear compartments (40, 45). The upper portion of the divider panel (38) is positioned below the deflector plate (20) to the rear of the first opening (24) and in front of the second opening (26). Thus, the front compartment (40) is in communication with the first opening (24) and the rear compartment (45) is in communication with the second opening (26).

The front compartment (40) includes a diagonal front baffle (41) that is directed downwardly and laterally away from the first opening (24). A number of discharge openings (42) are formed in the diagonal front baffle (41) and the end is spaced from sidewall (36). A vertical front baffle (43) is disposed below the diagonal front baffle (41) above the discharge openings (42). Vertical front support spacers (44) are disposed above and below the diagonal front baffle (41).

The rear compartment (45) is identical to the front compartment (40). As illustrated in FIG. 4, the rear compartment (45) includes a diagonal rear baffle (46), a vertical rear baffle (47), discharge openings (48), and vertical rear support spacers (49).

The optimum dimensions of the bander (10) are determined by the desired bandwidth, maximum terrain slope for which a consistent pattern is desired, and type of equipment it will be used on. The angle of diagonal front and rear baffles (41, 46) will determine the maximum slope for which the bander (10) will be operational. An angle of approximately 64° will work up to a 30° to 35° slope using a clay carrier such as "Oil Dry" oil absorbant. The angle of the diagonal baffles (41, 46) also determines the length of the body section (14) compared with the bandwidth.

In operation, when the bander (10) is on level ground, the granules will build up on the deflector plate (20) until they flow out of the first and second openings (24, 26) and down the corresponding diagonal baffles (41, 46). Discharge openings (42, 48) are formed to the correct size to provide a deposit of granules to fill the center of the pattern over the seed furrow (6). The center pattern can be changed by providing more discharge openings (42, 48) or by plugging or enlarging discharge openings (42, 48). The remaining granules flow down the diagonal baffles (41, 46) until they reach the gap between the end of the diagonal baffles (41, 46) and the sidewalls (34, 36). Varying the width of gap and length of sidewalls (34, 36) will determine bandwidth and granule distribution on each edge of the pattern.

If the bander (10) is tilted so that the first opening (22) is lower than the second opening (26), more granules will flow through the first opening (22), and down the diagonal front baffle (41). The vertical front baffle (43) will prevent granules that flow through discharge openings (42) from falling to the downhill side of the seed furrow (6) (See FIG. 5). This is the opposite effect that conventional spreaders have. More granules are placed on uphill side of the seed furrow (6) with the bander (10) of the present invention. This is an advantage because the slope of the ground and rain will tend to move the granules downhill.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. A granular chemical bander, comprising:
   supply tube means for supplying a quantity of granular material from a storage hopper;
   a housing including an upper neck section and a lower body section;
   said neck section having an opening at the top thereof for receiving the supply tube means, and having a horizontally disposed deflector plate at the bottom thereof, said deflector plate including a first opening at one side thereof and a second opening at another side thereof;
   said body section including a front compartment in communication with said first opening and means for directing granular material laterally away from said first opening to discharge from said front compartment in a band laterally off-set from said first opening in the direction of said second opening, and a rear compartment in communication with said second opening and means for directing granular material laterally away from said second opening to discharge from said rear compartment in a band laterally off-set from said second opening in the direction of said first opening.

2. The bander of claim 1 wherein said body section includes a front wall, a rear wall, opposing sidewalls and a transverse divider panel disposed within said body section intermediate said front wall and said rear wall and forming said front compartment and said rear compartment, the upper portion of said divider panel being disposed adjacent to and under said deflector plate such that the panel is disposed rearwardly of the first opening and forwardly of the second opening.

3. The bander of claim 1 wherein said means for directing granular material laterally away from said first opening includes a diagonal front baffle having a lower end, said diagonal front baffle being disposed below said first opening and directed downwardly and away therefrom, said front baffle including a discharge opening at the lower end thereof.

4. The bander of claim 1 wherein said means for directing granular material laterally away from said second opening includes a diagonal rear baffle having a lower end, said diagonal rear baffle being disposed below the second opening and directed downwardly and away therefrom, said rear baffle including a discharge opening at the lower end thereof.

5. The bander of claim 3 wherein a plurality of discharge openings are spaced along the lower end of said diagonal front baffle.

6. The bander of claim 4 wherein a plurality of discharge openings are spaced along the lower end of said diagonal rear baffle.

7. The bander of claim 5 further including a vertical front baffle attached below said diagonal front baffle at a point above said discharge openings.

8. The bander of claim 6 further including a vertical rear baffle attached below said diagonal rear baffle at a point above said discharge openings.

9. The bander of claim 1 further including a first focusing plate disposed within said neck section above said deflector plate, said first focusing plate having a central opening disposed directly above the central portion of said deflector plate.

10. The bander of claim 9 further including a second focusing plate disposed within said neck section intermediate said first focusing plate and said deflector plate, said second focusing plate having a central opening disposed directly above the central portion of said deflector plate.

11. The bander of claim 1 wherein said supply tube means includes:
a primary supply tube attached to and interconnecting said storage hopper and said neck section of said bander, said primary supply tube including a slot opening formed in the sidewall thereof;
a secondary supply tube having a smaller diameter than said primary supply tube and being adjustably received through said slot opening and into the interior of said primary supply tube, said secondary supply tube including means for adjustably apportioning the flow of granular material between the primary supply tube and the secondary supply tube.

12. The bander of claim 11 wherein said apportioning means includes:
a sidewall opening in said secondary supply tube; and
means for adjustably positioning said sidewall opening within said primary supply tube near said slot opening such that said sidewall opening is adjustably spaced from the interior sidewall of said primary supply tube.

13. The bander of claim 12 wherein said positioning means includes a plurality of spaced apertures in said secondary supply tube, an aperture in said primary supply tube, and a locking pin disposed to simultaneously engage one of said secondary supply tube apertures and said primary supply tube aperture when they are positioned in registry with each other.

* * * * *